UNITED STATES PATENT OFFICE.

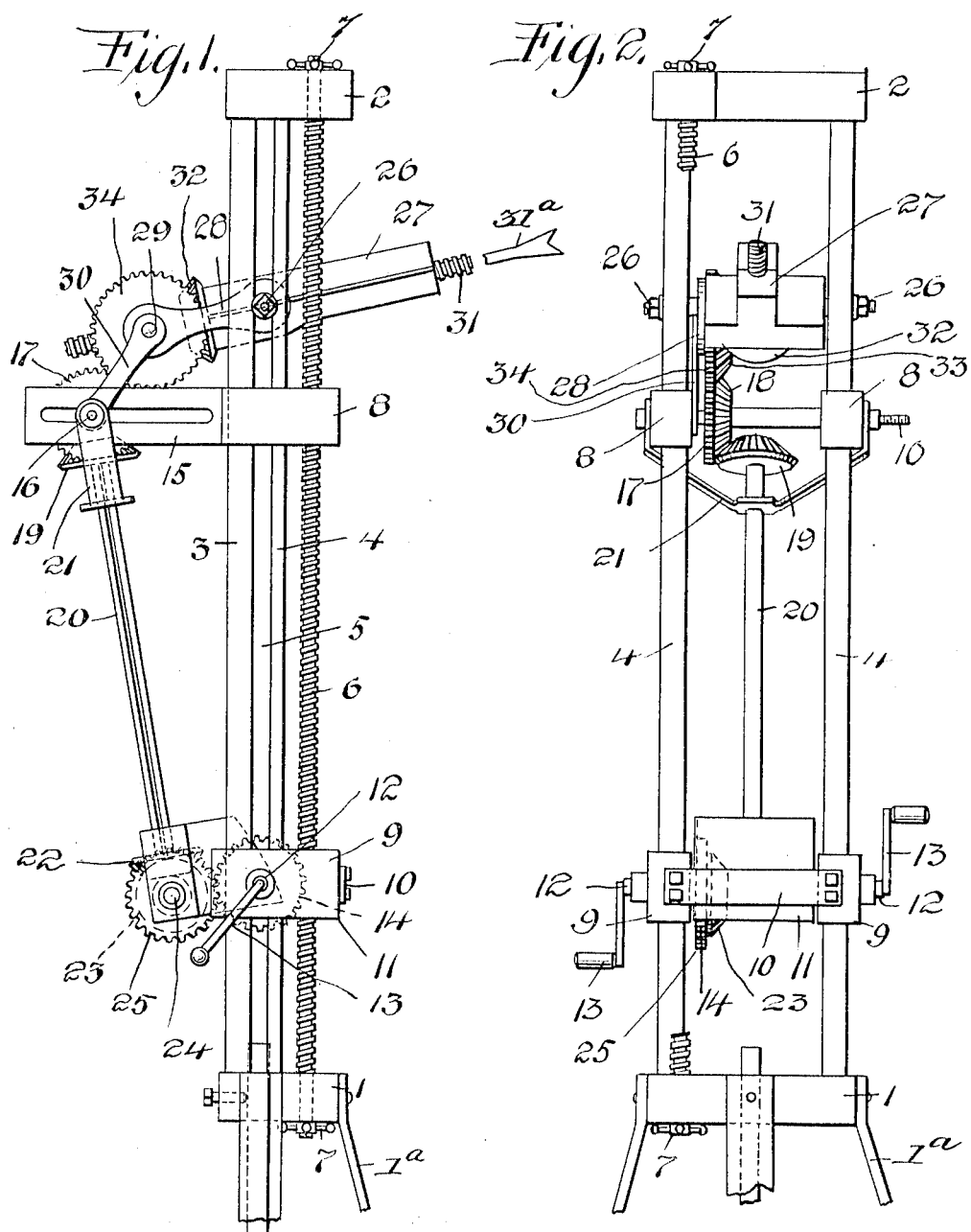

GIMI PICCONE AND SAMUEL LIPPIS, OF CHANDLER, COLORADO.

DRILLING-MACHINE.

1,072,256.
Specification of Letters Patent.
Patented Sept. 2, 1913.

Application filed November 4, 1912. Serial No. 729,476.

*To all whom it may concern:*

Be it known that we, GIMI PICCONE and SAMUEL LIPPIS, citizens of the United States of America, residing at Chandler, in the county of Fremont and State of Colorado, have invented certain new and useful Improvements in Drilling-Machines, of which the following is a specification, reference being had therein to the accompanying drawing.

This invention relates to a drilling machine, and the primary object of our invention is to provide a drilling machine that can be advantageously used in mines, quarries, excavations and other places for drilling holes to receive explosives for disintegrating earth, rock and other matter or for testing subterranean conditions.

Another object of this invention is to provide a drill machine that has an angularly disposed drill holder and novel means for imparting a rotary movement to the drill supported by said holder.

A further object of this invention is to provide a machine with an adjustable drill holder that can be shifted longitudinally of the machine without interfering with a transmission mechanism employed for imparting movement to the drilling machine.

A still further object of this invention is to provide a drilling machine consisting of comparatively few parts, that is strong and durable, easy to assemble, inexpensive to manufacture, easy to operate and highly efficient for the purposes for which it is intended.

With the above and other objects in view the invention resides in the novel construction, combination and arrangement of parts to be hereinafter specifically described and then claimed.

Reference will now be had to the drawing, wherein:—

Figure 1 is a side elevation of the drilling machine, and Fig. 2 is a front elevation of the same.

A machine in accordance with this invention comprises heads 1 and 2 connected by longitudinal parallel sets of guide bars 3 and 4, said bars providing longitudinal slots 5. The head 1 is mounted upon a support 1ª. Rotatably mounted in the heads 1 and 2 is a longitudinal feed screw 6 that has the ends thereof provided with hand wheels 7 whereby said screw can be easily rotated. Slidably mounted upon the bars 3 are supports 8 and 9 and the screw 6 passes through the supports 8 and 9 upon one of the bars 3 whereby said supports will be spaced apart and moved in unison by rotating the screw 6. The supports 9 are connected by a strap 10 supporting a housing 11 and journaled in said supports and extending through the slot 5 is a shaft 12. The ends of the shaft are provided with cranks or handles 13 and said shaft, within the housing 11 has a gear wheel 14. The supports 8 are provided with longitudinally slotted bearings 15 and movably arranged in said bearings is a revoluble shaft 16. The shaft 16 has a gear wheel 17 and a beveled gear wheel 18, said beveled gear wheel meshing with a similar wheel 19 mounted upon the end of an angularly disposed shaft 20, journaled in a bearing 21 movably supported by the ends of the shaft 16. The shaft 20 extends into the housing 11 and is provided with a beveled gear wheel 22 meshing with a similar wheel 23 mounted upon a shaft 24 journaled in the housing. The shaft 24, has a gear wheel 25 meshing with the gear wheel 14.

Slidably mounted in the slots 5 of the bars 3 and 4 are the trunnions 26 of a drill holder 27 and loosely mounted upon said trunnions are side links 28 pivotally connected by a transverse shaft 29 to side links 30 that are pivotally mounted upon the ends of the shaft 16. Screwed in the drill holder 27 is a drill shank 31 carrying a drill 31ª that is provided with a beveled gear wheel 32 meshing with a similar wheel 33 mounted upon the shaft 29. Another gear wheel 34 upon said shaft meshes with the gear wheel 17.

It is preferable to make the gear wheels 17 and 18, 33 and 34 and 23 and 25 integral, as shown in Fig. 2.

From the foregoing it is apparent that when the shaft 12 is revolved that through the medium of the train of gears power is transmitted to the drill shank 31 which is adjustably supported by the trunnions 26. The drill holder can be shifted longitudinally of the machine by the feed screw 6 and the machine conveniently used for various purposes.

While in the drawing there is illustrated a preferred embodiment of the invention, it is to be understood that the structural elements are susceptible to such changes, as in size, shape and manner of assemblage as fall within the scope of the appended claims.

What we claim is:—

1. A drilling machine comprising longitudinal guide bars, supports slidably mounted upon said bars, a revoluble shaft carried by one of said supports, a drill holder movably mounted upon said bars, a drill shank rotatably mounted in said holder, means carried by said supports for transmitting power from said shaft to said drill shank, and means located adjacent to said bars for simultaneously moving said supports thereon.

2. A drilling machine comprising parallel sets of bars, supports slidably mounted upon said bars, a drill holder movably supported by said bars, a drill shank rotatably mounted in said holder, means carried by said supports and including a train of gears for rotating said drill shank, and a feed screw arranged longitudinally of said machine for simultaneously moving said supports.

In testimony whereof we affix our signatures in the presence of two witnesses.

GIMI PICCONE.
SAMUEL LIPPIS.

Witnesses:
T. CAVANAUGH,
JOSEPH LLOYD.

Copies of this patent may be obtained for five cents each, by addressing the "Commissioner of Patents, Washington, D. C."